United States Patent
Suzuki et al.

(10) Patent No.: US 6,345,561 B1
(45) Date of Patent: Feb. 12, 2002

(54) WIRE MEASURING AND CUTTING APPARATUS AND METHOD OF MEASURING LENGTH OF WIRE

(75) Inventors: Hiroo Suzuki; Nobuaki Yamakawa; Akihiro Mizuno, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/324,806

(22) Filed: Jun. 3, 1999

(30) Foreign Application Priority Data

Jun. 5, 1998 (JP) .......................................... 10-157937

(51) Int. Cl.⁷ ................................................. B26D 7/14
(52) U.S. Cl. ............................. 83/176; 83/439; 83/907; 83/950; 104/102
(58) Field of Search .......................... 83/907, 950, 439, 83/176; 140/102

(56) References Cited

U.S. PATENT DOCUMENTS

| | | | | |
|---|---|---|---|---|
| 4,020,880 A | * | 5/1977 | Heller et al. ................ | 140/140 |
| 4,618,761 A | * | 10/1986 | Inoue et al. ................... | 83/171 |
| 5,327,628 A | * | 7/1994 | Gouda et al. ............... | 140/102 |
| 5,727,602 A | * | 3/1998 | Ema ............................ | 140/102 |
| 5,873,291 A | * | 2/1999 | Sand ............................ | 83/260 |

FOREIGN PATENT DOCUMENTS

JP            9-27222            1/1997

* cited by examiner

*Primary Examiner*—M. Rachuba
(74) *Attorney, Agent, or Firm*—Oblon, Spivak, McClelland, Maier & Neustadt, P.C.

(57) ABSTRACT

A wire measuring and cutting apparatus 1 is provided with an U-turn guide section 6 which serves to guide a wire W being fed into a guide passage 5b for bending the wire W in a substantially U-shaped manner. In the section 6, a movable guide part 5 is constituted by a pair of guide pieces 5a, 5a which are pivoted so as to open and close together. The U-turn guide section 6 is provided with a displacement mechanism 8. The mechanism 8 can maintain the pair of guide pieces 5a, 5a in the closed position. While, the mechanism 8 can displace the guide pieces 5a, 5a for the opened position together with feeding inertia of the wire W in process of measuring the length of the wire W. With this structure, the guide pieces 5a, 5a can be opened at high speed due to the feeding inertia in addition to the driving force of the mechanism 8 to open the pieces 5a, 5a and there is no need to stop feeding the wire W during the measurement of the wire W.

8 Claims, 10 Drawing Sheets

WIRE MEASURING AND CUTTING APPARATUS AND METHOD OF MEASURING LENGTH OF WIRE

BACKGROUND OF THE INVENTION

1. Field of the Invention

The present invention relates to a wire measuring and cutting apparatus and a method of measuring a length of the wire.

2. Description of Related Art

FIGS. 1 and 2 show a conventional wire measuring and cutting apparatus disclosed in Japanese Unexamined Patent Publication (kokai) No. 9-27222.

As shown in FIG. 1, the wire measuring and cutting apparatus 100 includes a wire feed unit 101 withdrawing a long size wire W from a not-shown wire stock and continuously feeding it along a designated pass line PL, a guide unit 102 succeeding the wire feed unit 101 and provided with a U-turn guide section 103 for guiding the fed wire W to a substantially U-shaped leading passage 103a for bending the wire W in a substantially U-shaped configuration, a nipping unit 104 for holding the wire W and a cutting unit 105 for cutting the wire W.

The wire feed unit 101 includes measuring rollers 120 constituted by a pair of encoder rollers, and plural feed rollers 121.

As shown in FIG. 2, the U-turn guide section 103 is constructed with a fixed guide part 106, a movable guide part 107 and a displacement mechanism 108. The movable part 107 is rotatably supported by the fixed guide part 106 so as to form a substantially U-shaped guide passage 103a in a closed position of the part 107 on one hand and also open the passage 103a in the opened position on the other hand. The displacement mechanism 108 operates to displace the movable guide part 107 between the closed position and the opened position.

In this arrangement, the fixed guide part 106 is made from a substantial semicircular member having a general semicircle-shaped convex circumference 106a, while the movable guide part 107 is made from a substantially U-shaped member having a general semicircle-shaped concave circumference 107a opposing the above circumference 106a in the closed position of the part 107. Formed on the concave circumference 107a is a circumferential groove which defines the guide passage 103a together with the above-mentioned circumference 106a when the movable guide part 107 is in the closed position. Further, the fixed guide part 106 is provided with a strut 110 standing thereon and having a pin member 111 projecting to right and left, horizontally. The movable guide part 107 is pivoted on the fixed guide part 106 since rotating arms 109 formed on both sides of the part 107 are rotatably mounted on the pin member 111.

The displacement mechanism 108 includes a cylinder 114 having its tube side pivoted to an attachment piece 112 fixed on the strut 110 and the rod side pivoted to a connecting piece 113 fixed on the movable guide part 107. With the expansion of a rod of the cylinder 114, the displacement mechanism 108 allows the movable guide part 107 to shift to the closed position thereby to define the guide passage 103a (see FIG. 2). On the contrary, with the shrinkage of the rod of the cylinder 114, the displacement mechanism 108 allows the movable guide part 107 to rotate from the closed position to the opened position upward (direction of arrow in FIG. 2) thereby to open the guide passage 103a.

In the shown conventional apparatus, the nipping unit 104 is disposed between the wire feed unit 101 and the U-turn guide section 103 and constituted by a first clamp 115 corresponding to an inlet of the guide passage 103a defined in the section 103 and a second clamp 116 corresponding to an outlet of the guide passage 103a.

According to the so-constructed wire measuring and cutting apparatus 100, the wire W fed by the wire feed unit 101 is firstly introduced into the guide passage 103 of the guide section 103 through the first clamp 115, so that the wire W is bent in the substantially U-shaped manner. The leading end of the wire W bent in this way is nipped by the second clamp 116.

Next, in the U-turn guide section 103, the movable guide part 107 is displaced to the opened position by the displacement mechanism 108, so that the guide passage 103a does open. Thereafter, by the wire feed unit 101, the wire W is further drawn out to measure the length of the wire W. During the opening state of the guide passage 103a, since the movable guide part 107 occupies the opened position resulting from the displacement in a direction perpendicular to the wire feeding direction, the wire W drawn out does not interfere with the movable guide part 107 thereby allowing the swiftness of the measuring operation.

However, the above-mentioned conventional wire measuring and cutting apparatus 100 has a problem as follows. That is, for some reasons that the movable guide part 107 is apt to be heavy and large-sized due to its structure of a single plate member; the displacement of the movable guide part 107 toward the opened position is carried out in the upward direction perpendicular to the wire feeding direction; and that the same displacement is carried out by the cylinder 114 only, the part 107 is apt to become slow in moving toward the opened position. Such a slow motion of the part 107 causes the measuring operation to be divided into a first stage to bend the wire W in the substantially U-shaped manner and a second stage to move the part 107 to the opened position, so that the operation is usually accompanied by time loss of at least 0.3 to 0.5 sec between the first stage and the second stage, which is far from the swiftness of measuring operation.

Additionally, as the opening and closing direction(s) of the movable guide part 107 is substantially perpendicular to the wire feeding direction of the wire W, if it is drawn out before the movable guide part 107 opens perfectly, there is raised a possibility of wire's hooking since the wire W does enter into the cicumferential groove of the guide part 107. Therefore, hitherto, it has been caused a necessity to order the drawing operation of the wire W to be ready for the complete opening of the movable guide part 107, which is far from the swiftness of measuring operation, too.

SUMMARY OF THE INVENTION

Under such a circumstance, it is therefore an object of the present invention to provide a wire measuring and cutting apparatus and a method of measuring the length of the wire, by which it is possible to carry out the opening operation of the guide passage in the U-turn guide section rapidly and continuously feed the wire during the opened state of the guide passage, whereby the swiftness of measuring operation can be realized.

The object of the present invention described above can be accomplished by a wire measuring and cutting apparatus comprising:

a wire feed unit having measuring rollers for measuring the length of a wire thereby to feed the wire along a designated pass line;

a guide unit provided with a U-turn guide section which includes a fixed guide part and a movable guide part which is pivoted with respect to the fixed guide part in such a manner that, when the movable guide part is in its closed position, the movable guide part defines a substantially U-shaped guide passage with respect to the fixed guide part and when the movable guide part is in its opened position, the movable guide part allows the U-shaped guide passage to open to the outside, the U-turn guide section being curved in a substantially U-shaped manner and also leading the wire being fed from the wire feed unit, into the U-shaped guide passage; and a nipping and cutting device for nipping and cutting the wire;

wherein the movable guide part is constituted by a pair of guide pieces which are pivoted so as to embody the movable guide part in the closed position when the guide pieces are closed together and also embody the movable guide part in the opened position when the guide pieces are opened together in parallel with a direction to feed the wire; and wherein the U-turn guide section is provided with a displacement mechanism which can maintain the pair of guide pieces in the closed position on one occasion and which can displace the guide pieces for the opened position on another occasion, being accompanied with feeding inertia of the wire in process of measuring the length of the wire.

In the above-mentioned invention, since the formation and opening of the guide passage is executed by together closing and opening two guide pieces forming the movable guide part, it is possible to reduce the opening/closing stroke and load on the movable guide part, which is required for forming and opening the guide passage.

In the arrangement, two guide pieces are not only maintained to the closed position by the displacement mechanism but displaced to the opened position as if they were forced to open by the wire being fed, due to the combination of opening force of the displacement mechanism itself with the feeding inertia of the wire.

Additionally, since two guide pieces are adapted so as to both open in parallel with the feeding direction of the wire, it is possible to open the guide pieces without increasing the feeding load for the wire and also lead the wire into the feeding direction while the guide pieces are in the opened position.

In the present invention mentioned above, it is preferable that the guide unit is provided with a guide block in which the U-turn guide section is arranged and which has forth and back paths for passing the wire therethrough, formed so as to open on the bottom face of the guide block, corresponding to an inlet and an outlet of the guide passage respectively and also preferable that both of the forth and back paths are adapted, on respective lower sides thereof, so as to be closed by a shutter.

In this case, the wire fed from the wire feed unit is introduced into the guide passage of the U-turn guide section via. the forth path of the guide block and unloaded to the back path of the guide block through the guide passage. The loading and unloading of the wire with respect to the guide passage can be carried out smooth while avoiding the interference with another member owing to the protection of the guide block having the shutter closed.

Furthermore, the wire in the forth and back paths of the guide block can be removed out of the block with ease owing to the opening operation of the shutter.

In the above-mentioned invention, more preferably, the displacement mechanism comprises:

a claw part engaging both of the guide pieces thereby to maintain the guide pieces in the closed position;

a solenoid arrangement associated with the claw part, the solenoid arrangement displacing the claw part into a disengagement position where the claw part is disengaged from the guide pieces in case of inputting a signal to confirm the wire at a first designated position in process of measuring the length of the wire; and a cylinder arrangement for moving the guide pieces to the opened or closed positions, the cylinder arrangement operating to urge the guide pieces from the closed positions to the opened positions in case of inputting a signal to confirm the wire at a second designated position where the length of the wire is shorter than that at the first designated position.

According to the above-mentioned invention, since the cylinder arrangement urges the guide pieces being maintained in the closed positions due to the engagement of the claw part to the opened positions, the disengagement of the claw part causes the guide pieces to be opened toward the respective opened positions at high speed due to both urging force of the cylinder arrangement and feeding inertia of the wire.

More preferably, the nipping and cutting device comprises:

a first nipping unit operating to begin to nip the wire after passing the U-turn guide section in case of inputting the confirmation signal exhibiting the wire at the first designated position;

a second nipping unit operating to nip the wire before reaching the U-turn guide section in case of inputting the confirmation signal exhibiting that the measuring of the wire has been completed;

a cutting unit for cutting the wire nipped by the first and second nipping units into a predetermined length; and a transfer unit serving to not only maintain the first and second nipping units in respective positions allowing to nip the wire, but also transfer a cut wire on nipping thereby to strike it into transfer clamps.

In operation, the first nipping unit does nip the wire almost simultaneously with the release of engagement of the claw part with the guide pieces. While, the second nipping unit does nip the wire when the nipping operation of the first nipping unit is completed. The feeding of wire is maintained until the second nipping unit begins to nip the wire and thereafter, the feeding is ended.

Further, the cutting unit is capable of cutting the wire nipped by the first and second nipping units stably.

Moreover, since the cut wire can be struck into the transfer clamp by moving the first and second nipping units nipping the cut wire by the transfer unit, it is possible to shift the cut wire from the cutting process to the striking process, rapidly.

In the present invention mentioned above, it is also preferable that the first nipping unit comprises a pair of first nipping parts respectively arranged so as to move up and down in two first through-holes which are formed to penetrate the guide block up and down while containing the back path and arranged at a proper distance along the back path;

the second nipping unit comprises a pair of second nipping parts respectively arranged so as to move up and down in two second through-holes which are formed to penetrate the guide block up and down while containing the forth path and arranged at a proper distance along the forth path;

the shutter is adapted so as to open at the time of the descent of the first and second nipping units; and that the transfer clamps are movably arranged so as to stop at respective intermediate positions of both of the first and second through-holes of the forth and back paths intermittently.

According to the embodiment, since the first and second nipping units and the transfer clamp are arranged three-dimensionally close to the guide block, the moving distance of the first and second nipping units required to strike the cut wire into the transfer clamp can be established small thereby to increase the speed of operation.

In the present invention, preferably, at least one of the first and second nipping units is equipped with a servomotor in order to nip the wire and release it.

In this case, since at least one nipping unit is driven by the servomotor, it can exhibit high responsibility in nipping and releasing the wire. Additionally, since the nipping unit is capable of the torque control in nipping the wire for the adjustment of nipping force, it is possible to cope with variations in diameter of the wire easily. Further, a tip length of the cut wire along the feeding direction can be accurately controlled by the nipping operation of the first nipping unit.

According to the invention, there is also provided a method of measuring a length of a wire, comprising the steps of:

feeding the wire into a U-turn guide section and sequentially bending the wire in a substantially U-shaped manner; and wherein the feeding step of the wire has been continued until the completion of the measuring step so that the opening operation of the U-turn guide section is executed and accompanied with feeding inertia of the wire being fed.

In the above-mentioned method, since the feeding of the wire is not stopped in process of measuring the wire, the measuring operation can be carried out speedily.

These and other objects and features of the present invention will become more fully apparent from the following description and appended claims taken in conjunction with the accompany drawing.

BRIEF DESCRIPTION OF THE DRAWINGS

FIG. 9A is a front view of the first gripping unit and FIG. 9B is a side view of the unit; and FIGS. 10A and 10B are bottom views of the first gripping unit, in which FIG. 10A shows respective clamping claws under their opened condition and FIG. 10B shows the clamping claws under their closed condition.

DESCRIPTION OF THE PREFERRED EMBODIMENT

Figure 1:
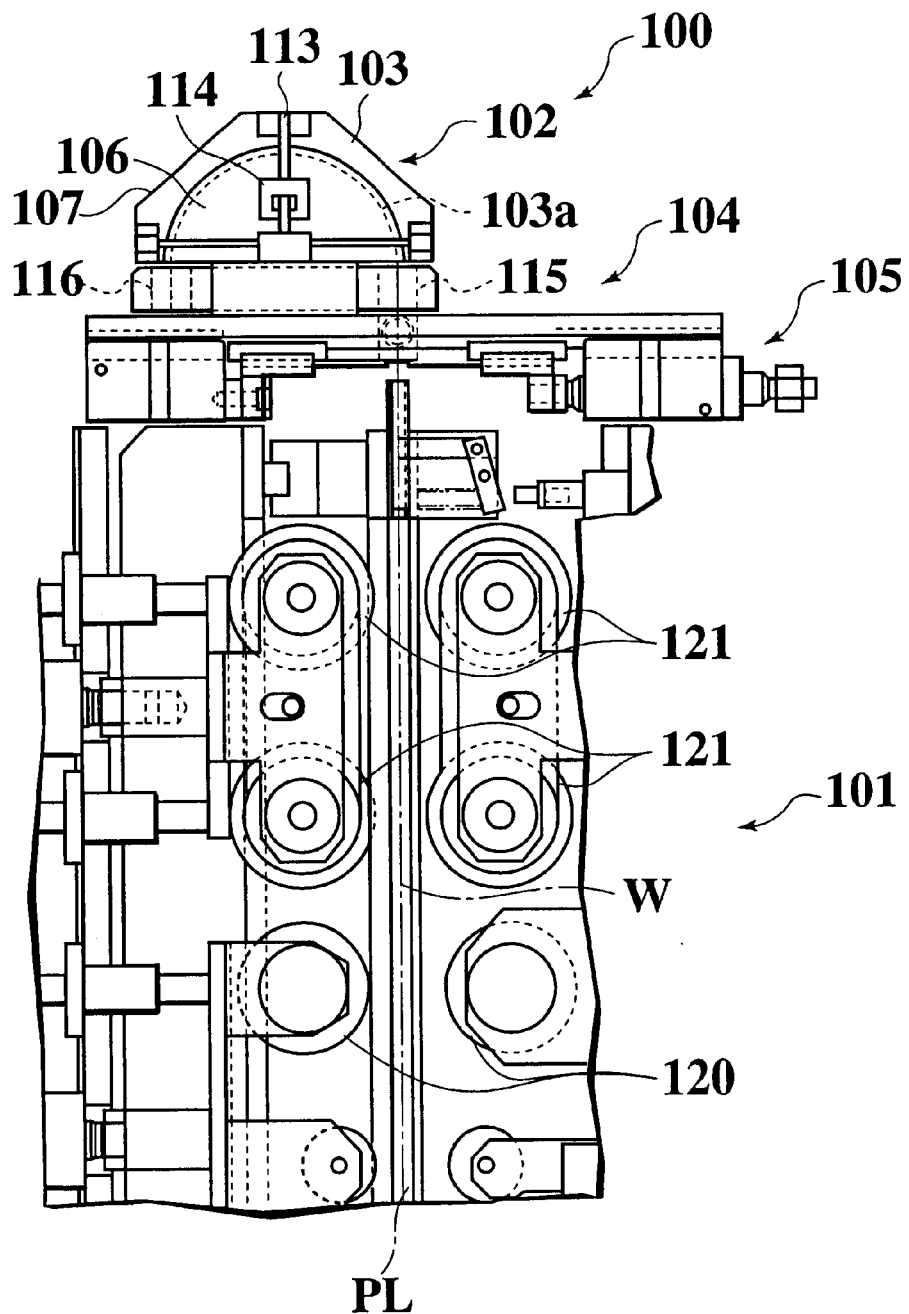
FIG. 1 is a plan view of the conventional wire measuring and cutting apparatus.
Figure 2:
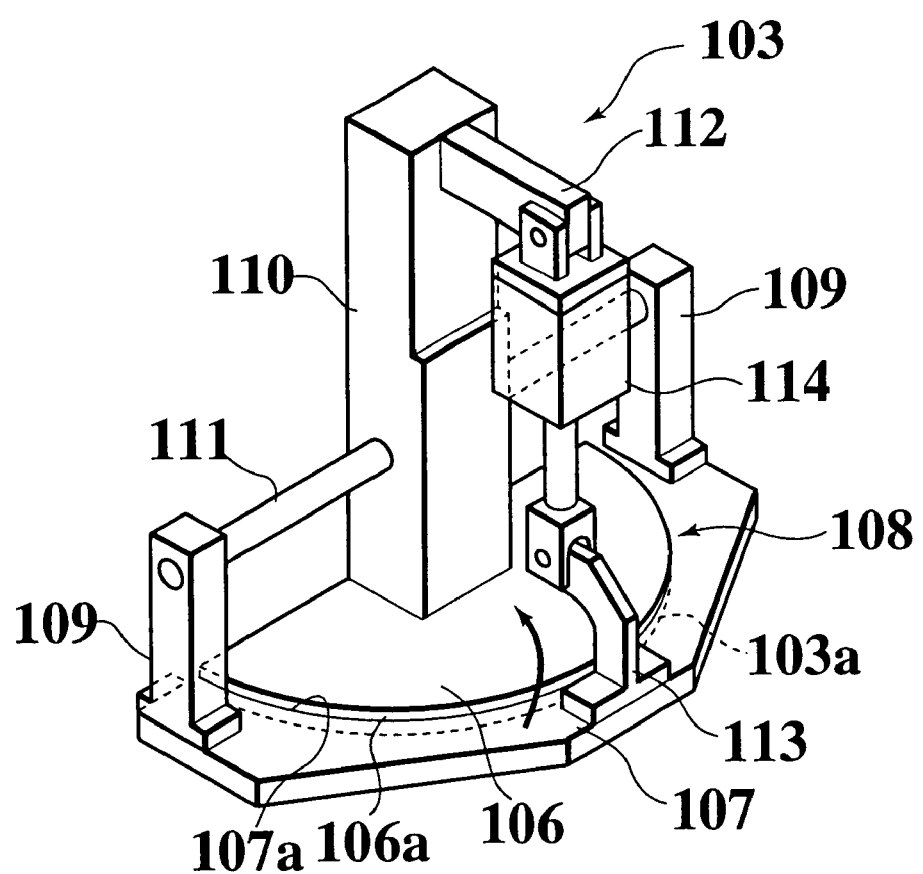
FIG. 2 is a perspective view of a U-turn guide part used in the conventional wire measuring and cutting apparatus of FIG. 1.

An embodiment of the present invention will be described with reference to the accompanying drawings.

FIGS. 3 to 8 show a wire measuring and cutting apparatus 1 in accordance with the embodiment of the invention. The wire measuring and cutting apparatus 1 comprises a wire feed unit 2, a guide unit 3 and a nipping and cutting device 7. Being provided with a pair of measuring rollers 25 for measuring the length of a wire W, the wire fed unit 2 does feed the wire W along a predetermined pass line PL. The guide unit 3 is constructed with a fixed guide part 4 and a movable guide part 5 both constituting a U-turn guide section 6. The U-turn guide section 6 operates to guide the wire W being fed by the wire feed unit 2 in order to bend the wire W in a substantially U-shaped manner. The movable guide part 5 is roratably supported by the fixed guide part 4 so as to form a substantially U-shaped guide passage 5b(see FIG. 4) in a closed position of the part 5 on one hand and also open the passage 5 in the opened position on the other hand.

Then, the movable guide part 5 is constituted by two guide pieces 5a, 5a which are pivotally supported so that the part 5 occupies its closed position (see FIG. 4) when both of the guide pieces 5a, 5a are together closed and also occupies the opened position ( see FIGS. 3 and 6) when both of the guide pieces 5a, 5a are together opened. The U-turn guide section 6 is provided with a displacement mechanism 8 which maintains the guide pieces 5a, 5a in the closed position and also displaces them into the opened position due to feeding inertia of the wire W in process of measuring it.

Figure 3:
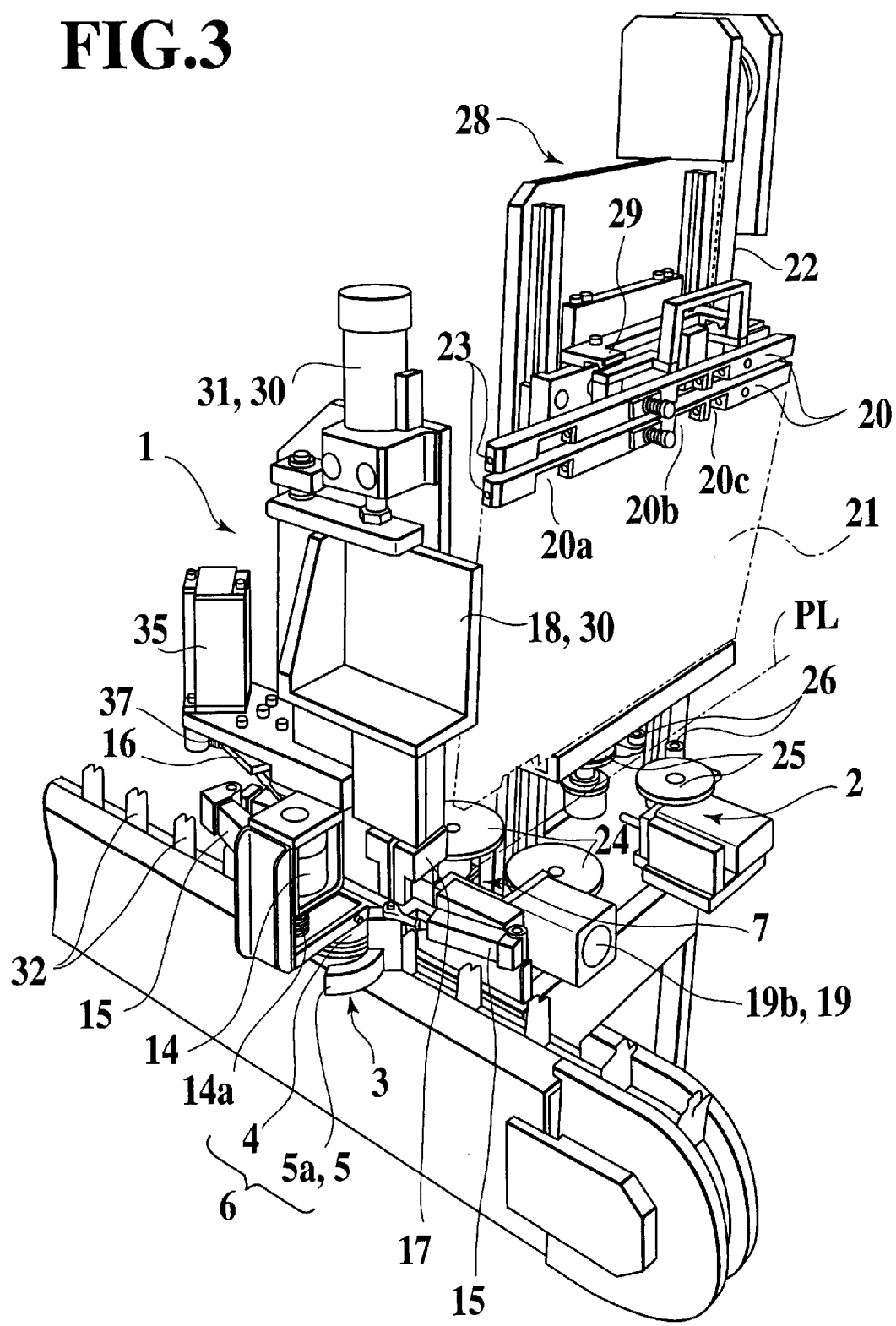
FIG. 3 is a perspective view of a wire measuring and cutting apparatus in accordance with an embodiment of the present invention.

As shown in FIG. 3, the pass line PL is constituted by each wire guide nozzle 20 in a wire guide nozzle assembly 21 installed in a nozzle driving device 28. That is, the wire guide nozzle assembly 21 assembled to the nozzle driving device 28 is intermittently driven through a timing belt 22 so that each wire guide nozzle 20 can stop at a designated position corresponding to the pass line PL. Thus, the wire guide nozzle 20 staying at the above designated position constitutes the pass line PL. Then, the wire W is fed while penetrating through a nozzle (hole) 23 of the wire guide nozzle 20. Note, FIG. 3 shows a situation where the wire guide nozzles 20 of the wire guide nozzle assembly 21 are partially eliminated and the wire guide nozzle assembly 21 has not been completed yet. The attaching of the wire guide nozzle assembly 21 to the nozzle driving device 28 can be accomplished since the upper part of the assembly 21 depressed from the condition of FIG. 3 engages with engagement claws 29.

The wire feed unit 2 is positioned on both sides of the wire guide nozzle 20 constituting the pass line PL and constituted by a pair of feed rollers 24, the pair of measuring rollers 25 and a pair of joint detection rollers 26, all pairs of which do nip the wire W entering into respective wire nipping spaces 20a, 20b and 20c of each wire guide nozzle 20 and inserted into the nozzle 23.

The fixed guide part 4 constituting the U-turn guide section 6 on one hand is shaped in the form of a semicircular plate, while the movable guide part 5 is constituted by two guide pieces 5a, 5a which are provided by dividing an arc member, which abuts on the circumferential curved face of the fixed guide part 4, into two pieces in the member's portion adjacent to the top of the circumferential curved face, and also provided by pivoting the resultant pieces' ends on the opposite side of respective ends of the pieces resulting from the above division. Under condition that the guide pieces 5a, 5a are being closed, then the guide passage 5b is defined by the circumferential curved face of the fixed guide part 4 or/and respective grooves formed in the surfaces of the guide pieces 5a, 5a contacting the circumferential curved face of the part 4.

Figure 4:
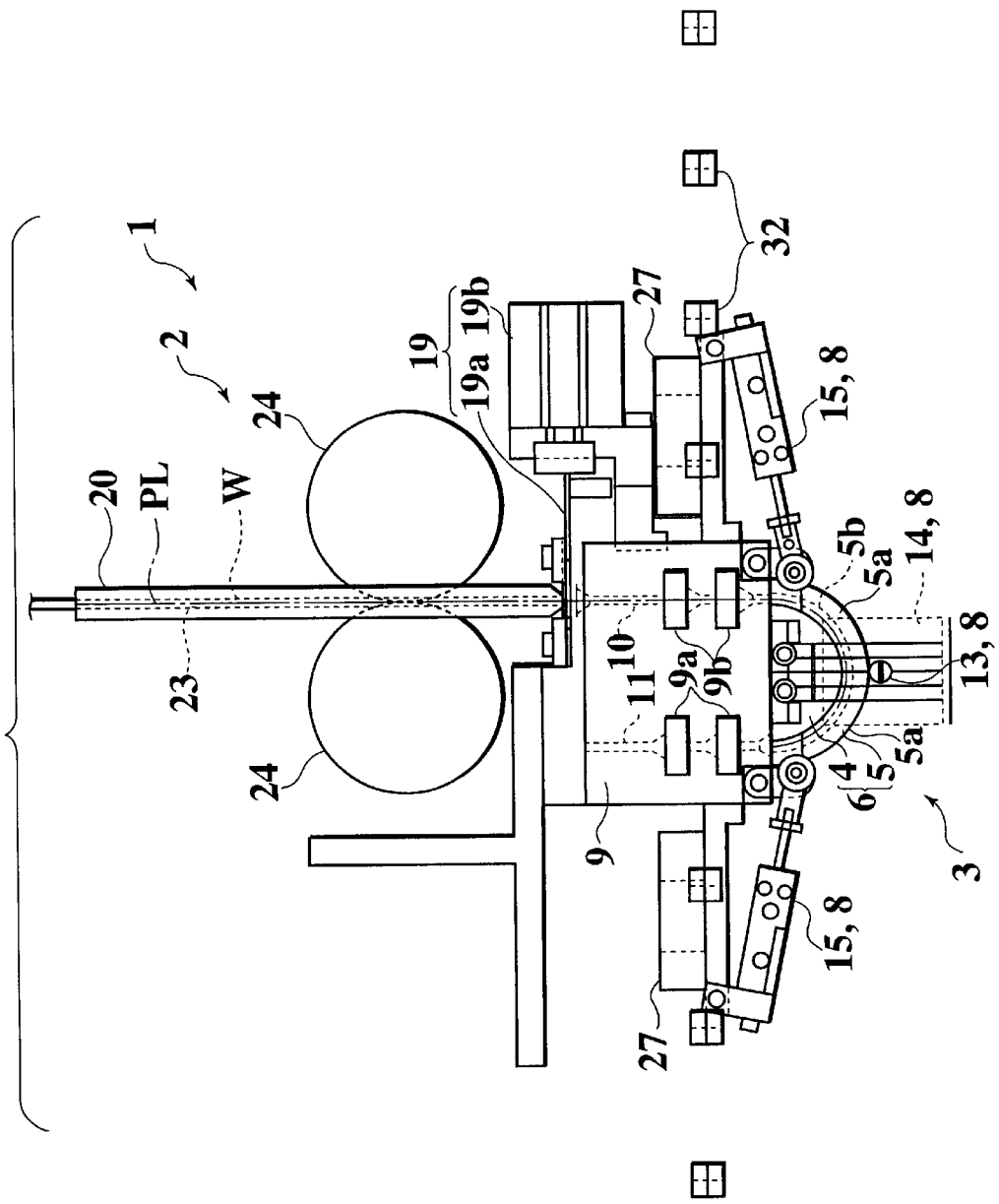
FIG. 4 is a plan view of the wire measuring and cutting apparatus of FIG. 3, deleting a gripping mechanism of the apparatus in order to prevent the congestion.

The guide unit 3 is constructed with the U-turn guide section 6. That is, the guide unit 3 includes a guide block 9 where the U-turn guide section 6 is provided, as shown in FIG. 4. In order to allow the wire W to pass, the guide block 9 has a forth path 10 and a back path 11 respectively formed corresponding to the inlet and outlet of the guide passage 5b so as to open on the bottom face of the guide block 9. Additionally, both forth and back paths 10, 11 are adapted, on respective lower sides thereof, so as to be closed by a shutter 12 (see FIG. 5). The shutter 12 is constituted by two plate bodies corresponding to the forth and back paths 10, 11 and the opening and closing operations of the shutter 12 are carried out by a shutter cylinder 27 coupled to the respective plate bodies.

With the constitution mentioned above, the wire W fed from the wire feed unit 2 is introduced into the guide passage 5b of the U-turn guide section 6 via. the forth path 10 of the guide block 9 and unloaded to the back path 11 of the guide block 9 through the guide passage 5b. The loading and unloading of the wire W with respect to the passage 5b can be carried out smooth while avoiding the interference with another member owing to the protection of the guide block 9 having the shutter 12 closed. Note, the wire W in the paths 10, 11 of the block 9 can be removed therefrom with ease by opening the shutter 12.

The displacement mechanism 8 comprises a claw part 13 (see FIG. 5) engaging both guide pieces 5a, 5a to maintain them in the closed position, a solenoid arrangement 14 associated with the claw part 13 to displace it into the disengagement position when inputting a signal to confirm the wire W at a first designated position in process of being measured and a pair of cylinder arrangements 15, 15 for moving the guide pieces 5a, 5a to their opened or closed positions. Further, on input of a signal to confirm the wire W at a second designated position where the length of the wire W is shorter than that at the first designated position, the cylinder arrangements 15, 15 operate to urge the guide pieces 5a, 5a from the closed positions to the opened positions.

Figure 5:
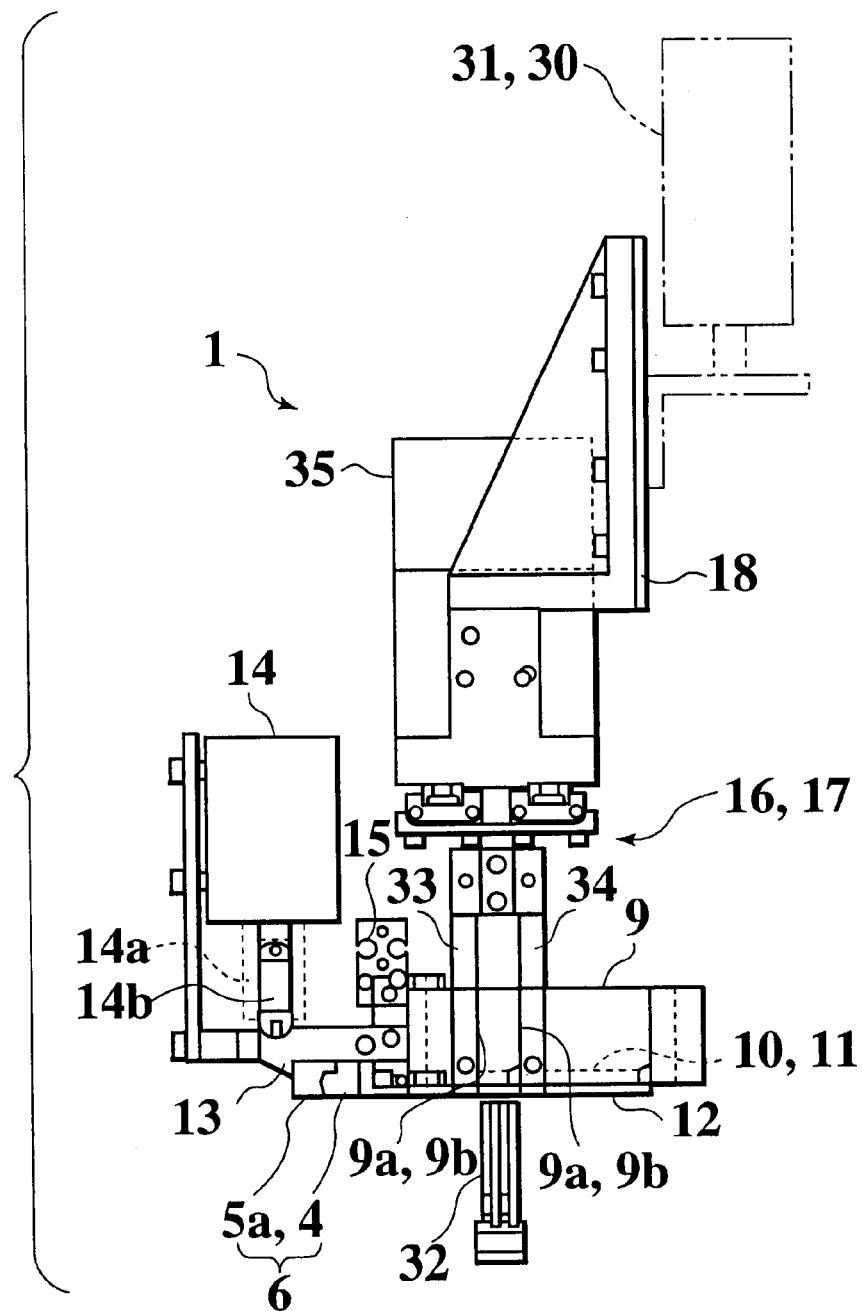
FIG. 5 is a side view of the wire measuring and cutting apparatus of FIG. 3, deleting a cutting mechanism of the apparatus in order to prevent the congestion.
Figure 6:
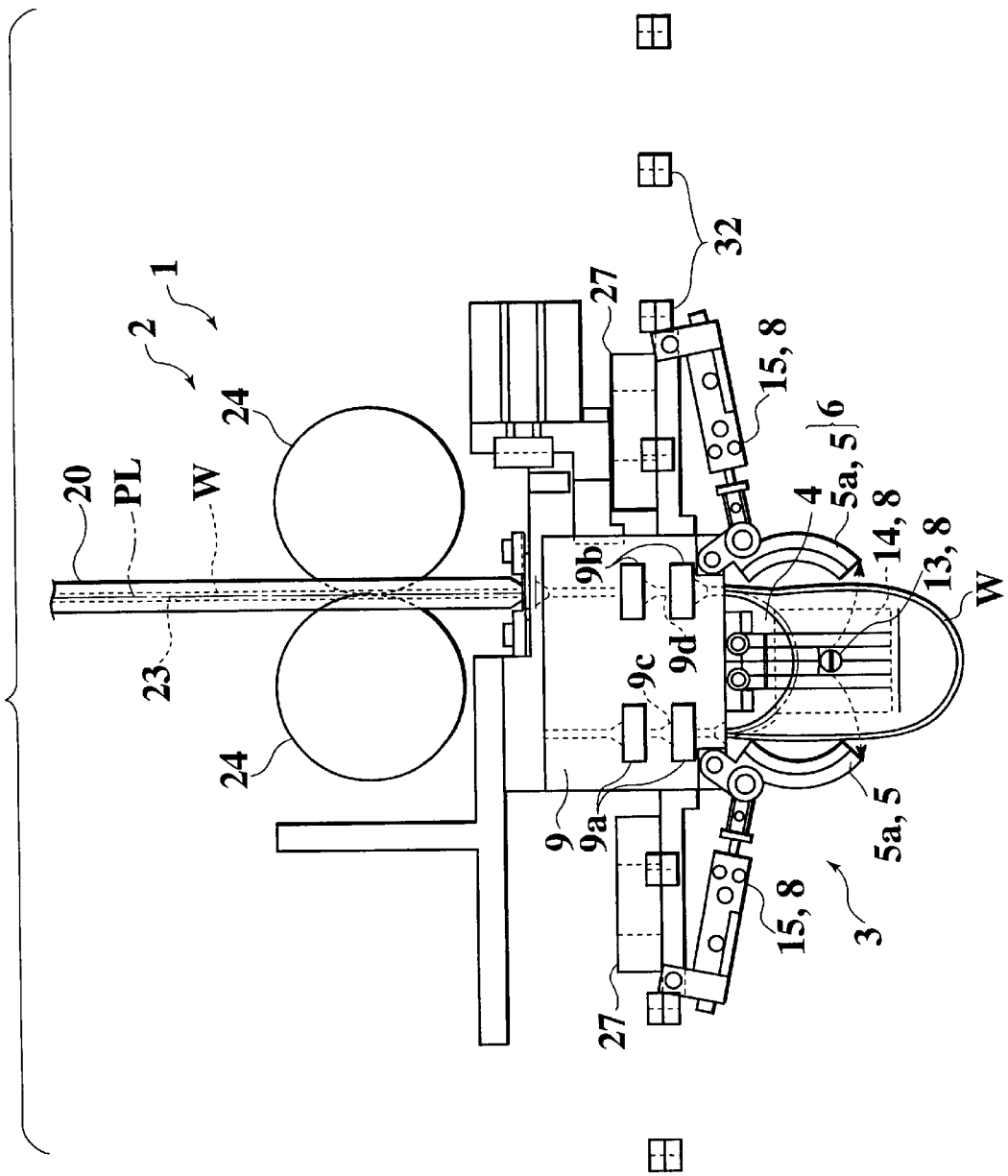
FIG. 6 is a plan view of the wire measuring and cutting apparatus of FIG. 4, showing respective guide pieces under their opened condition.
Figure 7:
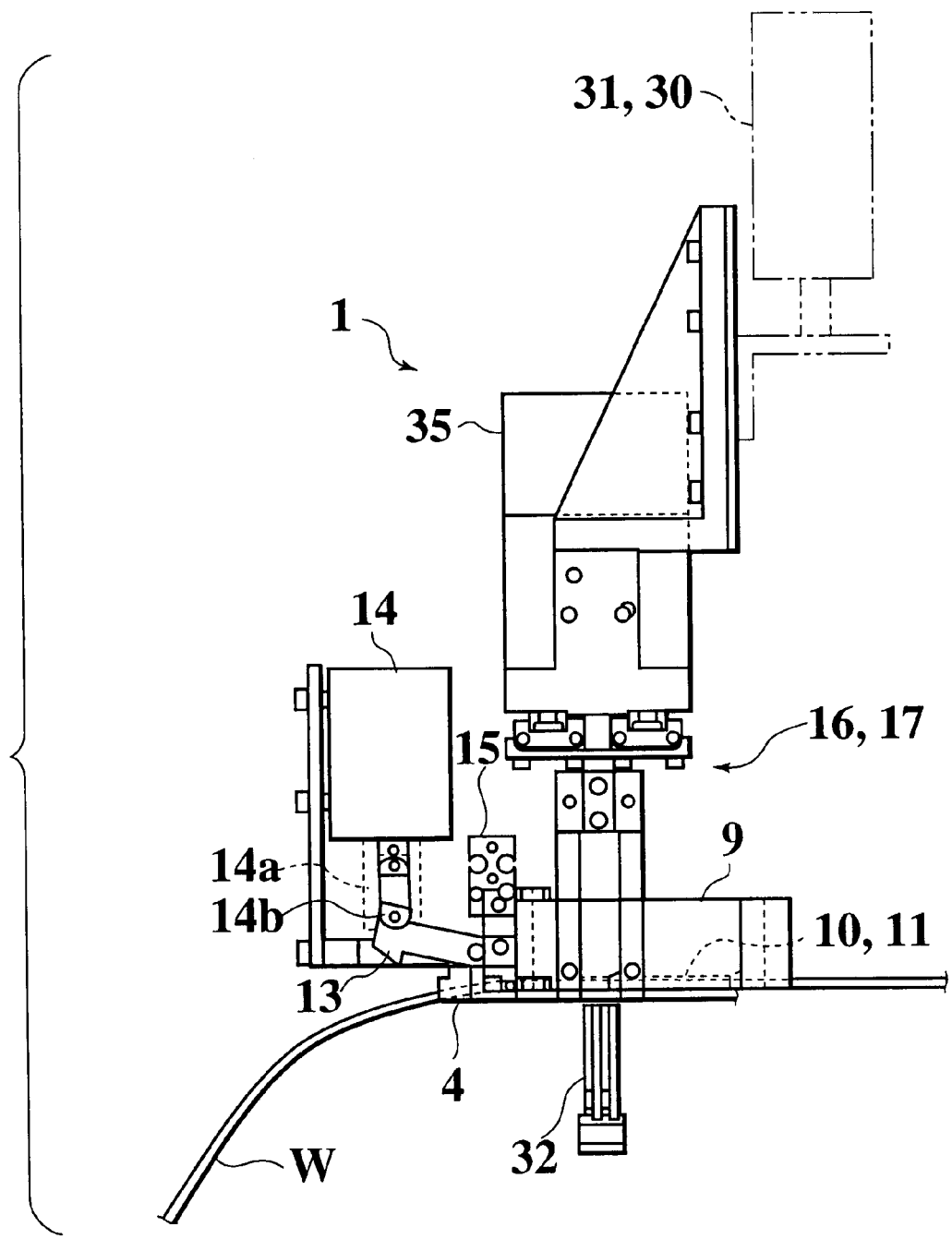
FIG. 7 is a side view of the wire measuring and cutting apparatus of FIG. 5, showing a claw part under its disengaged condition.

As shown in FIG. 5, the claw part 13 is formed at a tip of a rod body of which base part is disposed on the U-turn guide section 6 and also pivoted to the side face of the guide block 9. In operation, the claw part 13 is capable of engaging with the separable ends of the guide pieces 5a, 5a simultaneously thereby to maintain them in the closed positions.

As shown in FIG. 5, the solenoid arrangement 14 includes a clamp 14b associated with the tip of the rod body containing the claw part 13 and a spring 14a wound about the clamp 14b for urging the claw part 13 to the engagement position. In operation, at the initial stage of feeding the wire W, the claw part 13 is maintained to the engagement position by the spring 14a. On the other hand, when inputting the confirmation signal of the first designated position in process of measuring the wire W through the measuring rollers 25, the clamp 14b allows the claw part 13 to be displaced to the disengagement position in opposition to the force of the spring 14a (see FIG. 7).

The cylinder arrangements 15, 15 are associated with respective pivotal portions of the guide pieces 5a, 5a (see FIGS. 3 and 4) thereby to close and open them. Repeatedly, when there is inputted the signal to confirm the wire W at the second designated position where the length of the wire W is shorter than that at the first designated position, the cylinder arrangements 15, 15 operate to urge the guide pieces 5a, 5a from the closed positions to the opened positions. At the time of inputting of the confirmation signal of the second designated position, both guide pieces 5a, 5a are maintained to the closed position in spite of urging of the cylinder arrangements 15, 15 since the claw part 13 is maintained in the engagement position.

According to the so-constructed displacement mechanism 8, since the cylinder arrangements 15, 15 urge the guide pieces 5a, 5a being maintained in the closed positions due to the engagement of the claw part 13, to the opened positions, the disengagement of the claw part 13 causes the guide pieces 5a, 5a to be opened toward the respective opened positions at high speed due to both urging force of the cylinder arrangements 15, 15 and inertia of the wire W on feed.

The nipping and cutting device 7 comprises a first nipping unit 16, a second nipping unit 17, a cutting unit 19 for cutting the wire W nipped by the first and second nipping units 16, 16 into a predetermined length and a transfer unit 30. Note, in the device 7, the first nipping unit 16 operates to begin to nip the wire W after passing the U-turn guide section 6 when inputting the confirmation signal exhibiting the wire W at the above first designated position. While, the second nipping unit 17 operates to nip the wire W before reaching the U-turn guide section 6 when inputting the confirmation signal exhibiting that the measuring of the wire W has been completed. The transfer unit 30 serves to not only maintain the first and second nipping units 16, 17 in respective positions capable of nipping the wire W, but also transfer the cut wire W1 on nipping thereby to strike it into a transfer clamp 32.

According to the above-mentioned constitution, the first nipping unit 16 does nip the wire W at the substantial same time of the disengagement operation of the claw 13 from the guide pieces 5a, 5a . The nipping operation of the wire W executed by the first nipping unit 16 causes the feeding inertia on the wire W at the time of releasing the guide pieces 5a, 5a to be further increased. The second nipping unit 17 begins to nip the wire W on input of the confirmation signal that the measuring of the wire W is completed by the measuring rollers 25 since the wire W has been nipped by the first nipping unit 16. Then, the feeding of the wire W has been continued until the wire W is nipped by the second nipping unit 17. Once the wire W is nipped, then the feeding is ended.

As shown in FIG. 4, the cutting unit 19 includes a cutter 19a arranged just before the inlet for wire W of the forth path 10 in the guide block 9 and a cutter cylinder 19b for driving the cutter 19a. When inputting the confirmation signal representing the measuring of the wire W being finished from the measuring rollers 25, the cutter cylinder 19b is activated to cut off the wire W into the designated length through the cutter 19a. Thus, the cutting unit 19 is capable of cutting off the wire W being held by the first and second nipping units 16, 17 stably.

The transfer unit 30 further includes a connecting member 18 securing the first and second nipping units 16, 17 thereon and a transfer cylinder 31 associated with the connecting member 18 (see FIG. 3 and FIG. 4). In the transfer unit 30, the transfer cylinder 31 is activated by inputting the confirmation signal representing the completion of cutting from the cutter cylinder 19b, so that the first and second nipping units 16, 17 nipping the cut wire W1 can be moved from the position allowing the wire W to be nipped. Since the cut wire W1 can be struck into the transfer clamp 32 owing to this movement (see FIG. 8), it is possible to shift the cut wire W1 from the cutting process to the striking process rapidly.

According to the embodiment, the first nipping unit 16 comprises a pair of first nipping parts 33, 34 respectively arranged so as to move up and down in the through-holes 9a, 9b (see FIG. 4) which are formed to penetrate the guide block 9 up and down while containing the back path 11 and arranged at a proper distance along the back path 11. Similarly, the second nipping unit 17 comprises a pair of second nipping parts respectively arranged so as to move up and down in the through-holes 9a, 9b (see FIG. 4) which are formed to penetrate the guide block 9 up and down while containing the forth path 10 and arranged at a proper distance along the forth path 10. The shutter 12 is attached so as to open at the time of the descent of the first and second nipping units 16, 17. The transfer clamp 32 is movably arranged so as to stop at respective intermediate parts 9c, 9d (FIG. 6) of each two through-holes 9a, 9a and 9b, 9b of the forth and back paths 10, 11.

Figure 9B:
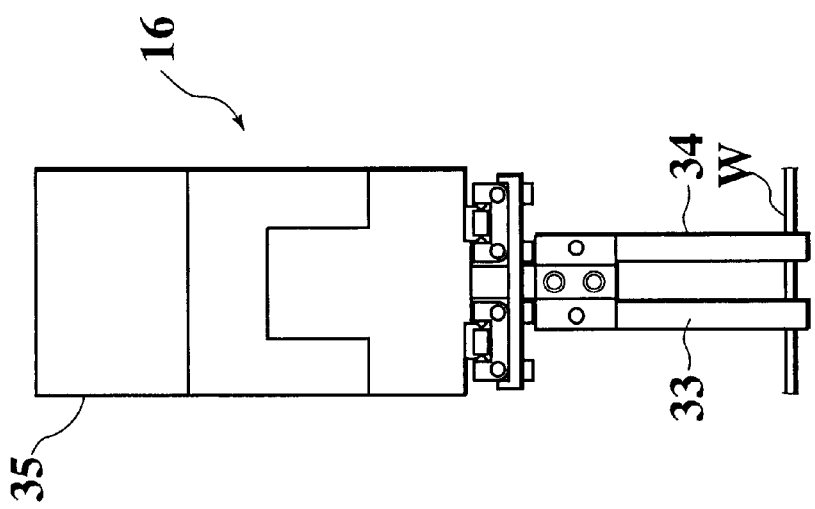
FIGS. 9A and 9B show a first gripping unit used in the apparatus of FIG. 3.
Figure 9A:
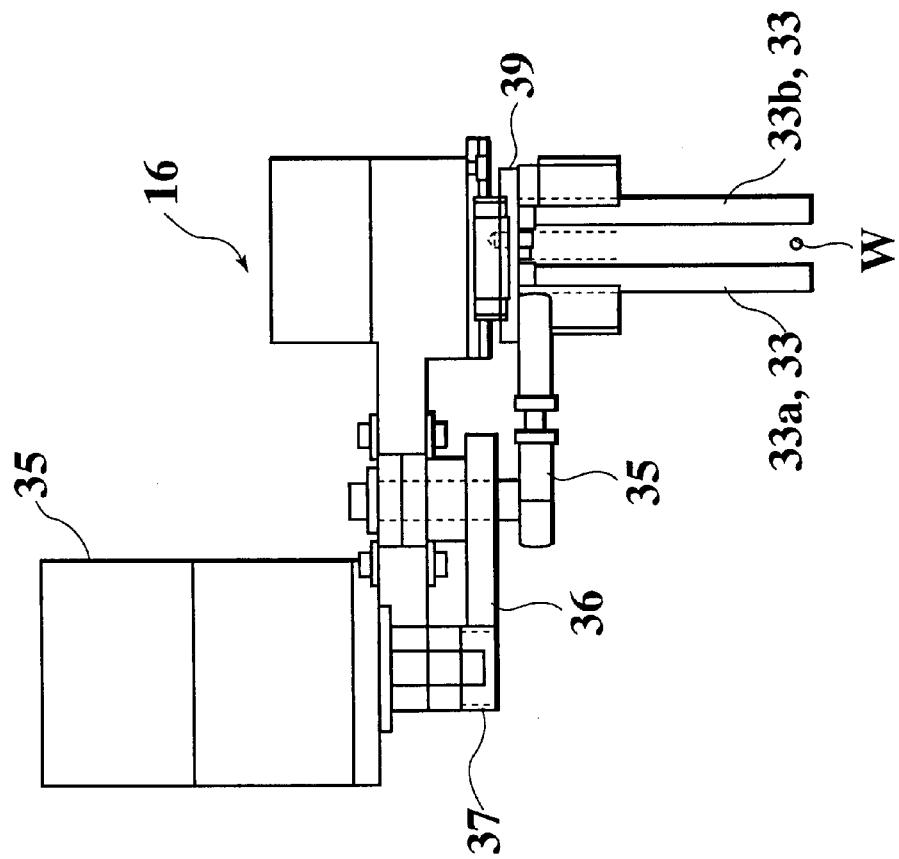
Figure 10A:
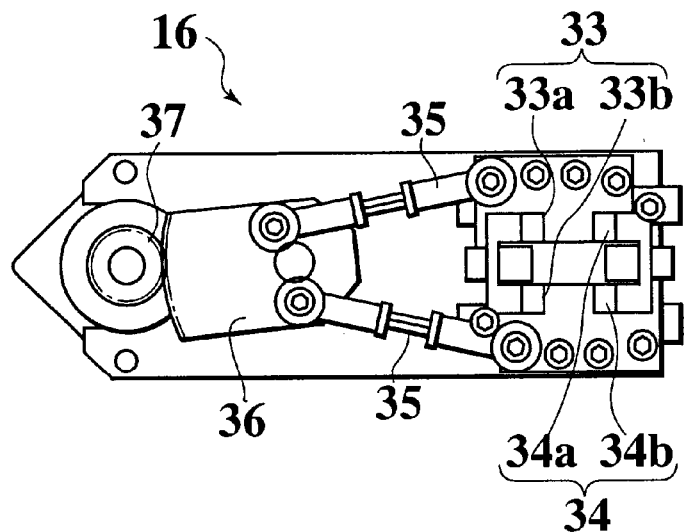
Figure 10B:
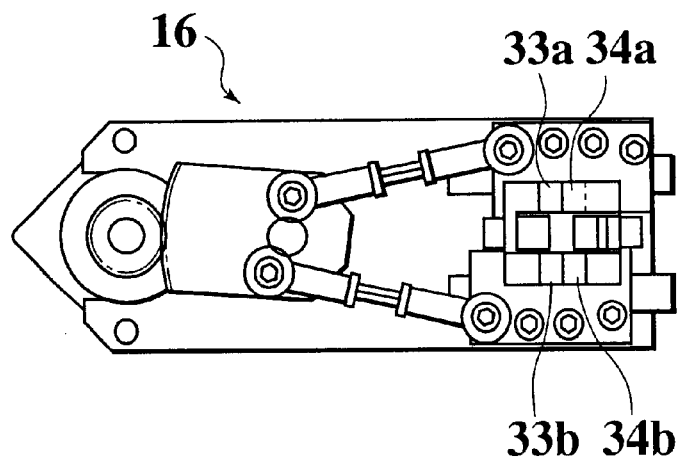

Regarding the first and second nipping units 16 and 17, at least the first nipping unit 16 is equipped with servomotors 35 in order to nip the wire and release it, as shown in FIGS. 9 and 10. The first nipping unit 16 is constructed as a servo-chuck, including a pinion gear 37 rotated by the servomotors 35, a swing gear 39 in mesh with the pinion gear 37 for rotating the gear 39, a slider 39 connected with the gear 36 through a link 38 and adapted so as to slide on following the swinging gear 36 and also the pair of first nipping parts 33, 34 fixed to the slider 39, for nipping the wire W and releasing it by the sliding movement of the slider 39. The first nipping units 33, 34 are constituted by clamp claws 33a, 33b and 34a, 34b, respectively and therefore, the units 33, 34 are constructed so as to carry out both nipping and releasing of the wire W owing to the respective engagement and disengagement between the clamp claws 33a, 33b and the clamp claws 34a, 34b.

The first nipping unit 16 is attached while inserting the clamp claws 33a, 33b of the first nipping part 33 into one through-hole 9a of the guide block 9 on one hand and also inserting the clamp claws 34a, 34b of the first nipping part 34 into the other through-hole 9a of the guide block 9 on the other hand.

Since the first nipping unit 16 of the embodiment is driven by the servomotors 35, it can exhibit high responsibility in nipping and releasing the wire W. Additionally, since the unit 16 is capable of the torque control in nipping the wire W for the adjustment of nipping force, it is possible to cope with variations in diameter of the wire W easily. Further, a tip length of the cut wire W1 along the feeding direction can be accurately controlled by the nipping operation of the first nipping unit 16. For example, it is possible to manage the tip length of the cut wire W1 from the nipping portion of the first nipping unit 16 in error less than one millimeter, whereby the cut wire W1 can be transferred to the next process smooth.

Although the second nipping unit 17 may be constructed as the servo-chuck similarly to the first nipping unit 16, the same unit 17 of the embodiment is constructed by an air chuck because it is not required to have so high accuracy. Similarly, the second nipping unit 17 is equipped with a pair of second nipping parts which consist of the similar clamp claws as those of the first nipping unit 16. The second nipping unit 17 is also attached while inserting two clamp claws of the second nipping part into one through-hole 9a of the guide block 9 on one hand and also inserting two clamp claws of the second nipping part into the other through-hole 9a of the guide block 9 on the other hand.

The shutter 12 is adapted so as to open by the shutter cylinder 27 when inputting the confirmation signal representing the completion of measuring the wire W from the measuring rollers 25. The opening of the shutter 12 allows the forth and back paths 10, 11 of the guide block 9 and the through-holes 9a, 9b to open respectively, thereby permitting the first and second nipping units 16, 17 to being lowered.

Figure 8:
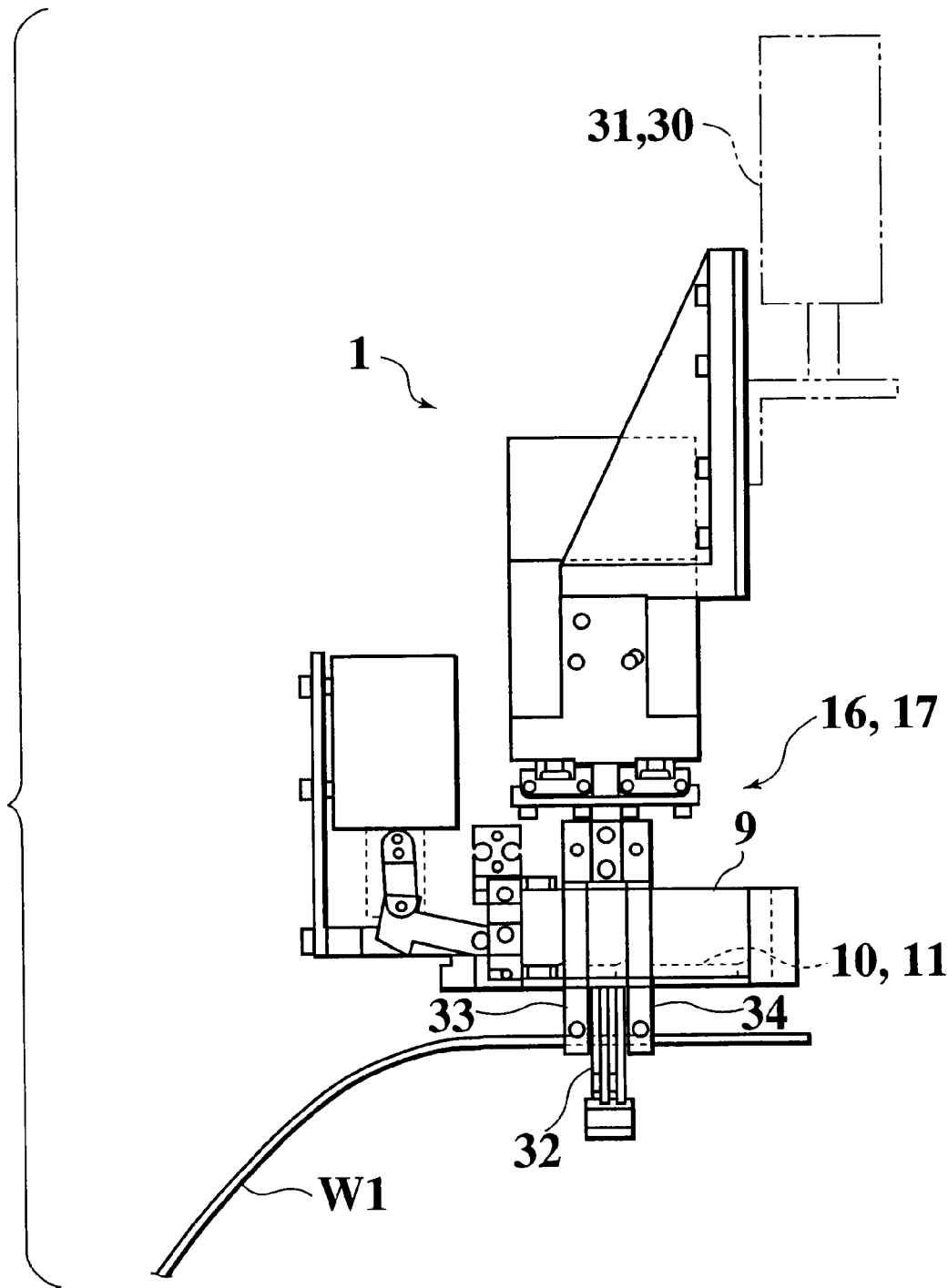
FIG. 8 is a side view of the wire measuring and cutting apparatus of FIG. 5, showing a cut wire under its struck condition.

Stopping at respective positions corresponding to the intermediate positions 9c, 9d simultaneously, the transfer clamps 32, 32 are subjected to the striking of the cut wire W1 by the first and second nipping units 16, 17 descending simultaneously (see FIG. 8).

According to the embodiment, since the first and second nipping units 16, 17 and the transfer clamps 32, 32 are arranged three-dimensionally close to the guide block 9, the moving distance of the first and second nipping units 16, 17 required to strike the cut wire W1 into the transfer clamps 32, 32 can be established small thereby to increase the speed of operation.

Furthermore, as the first and second nipping units 16, 17 are respectively constituted by the pair of first and second nipping parts and furthermore, the transfer clamps 32, 32 respectively stop at the intermediate positions 9c, 9d of the through-holes 9a, 9a and 9b, 9b, the wire portions struck into the respective transfer clamps 32, 32 are identical to respective middle portions of the wire portions nipped by the corresponding pairs of nipping parts, whereby it is possible to ensure the stability and reliability in striking the wire into the transfer clamps 32, 32.

The so-cut wire W1 is transferred to the next process (e.g. peeling process) by the moving of the transfer clamps 32, 32 after the wire W1 has been struck into the clamps 32, 32.

In the wire measuring and cutting apparatus 1 constructed above, the formation and deformation of the guide passage 5b is executed by two guide pieces'(5a, 5a ) closing and opening together, it is possible to reduce the opening/closing stroke and load on the movable guide part 5, which are necessary to form and deform the guide passage 5b. Note, it will be easily understood that the above reduction of load is derived from the light structure of the movable guide part 5 composed of two guide pieces 5a, 5a . Consequently, it is possible to provide the small-sized and compact displacement mechanism 8.

Again, both guide pieces 5a, 5a are displaced to the opened positions by the feeding inertia, which is produced by feeding the wire W, in addition to the driving force of the displacement mechanism 8 in the direction to open the movable guide part 5. Therefore, it is possible to raise the opening speed of the guide passage 5b of the U-turn guide section 6 and maintain the feeding of the wire even when opening the guide passage 5b, whereby the measuring work for the wire can be accomplished speedily.

Furthermore, since two guide pieces 5a, 5a are adapted so as to open in a parallel manner with the feeding direction of the wire W, it is possible to open the guide pieces 5a, 5a without increasing the feeding load of the wire W and also guide the wire W in the feeding direction in spite of the guide pieces 5a, 5a being in the opened position, whereby the measuring accuracy for the wire W can be improved.

According to the wire measuring method in the embodiment, the wire W is introduced to the U-turn guide section 6 for its bending into the substantially U-shaped profile and thereafter, the opening of the section 6 for measuring the length of the wire W is executed together with the feeding inertia of the wire W, so that the feeding of the wire W is continued up to the completion of measuring.

Thus, since there is no operation to stop feeding the wire W in process of measuring the length in the present measuring method, it is possible to increase the speed in measuring the wire W, whereby the productivity can be improved in conclusion.

Finally, it will be understood by those skilled in the art that the foregoing description is related to one preferred embodiment of the disclosed wire measuring and cutting apparatus and the wire measuring method, and that various changes and modifications may be made to the present invention without departing from the spirit and scope thereof.

What is claimed is:

1. A wire measuring and cutting apparatus comprising:
   a wire feed unit having a plurality of measuring rollers configured to measure a length of a wire and feed the wire along a designated pass line;
   a guide unit including a U-turn guide section configured to lead the wire being fed from the wire feed unit into a substantially U-shaped guide passage, the U-turn guide section including a fixed guide part and a plurality of movable guide pieces each configured to pivot with respect to the fixed guide part such that, when the plurality of movable guide pieces is in a closed position, the plurality of movable guide pieces forms the substantially U-shaped guide passage with the fixed guide part and when the plurality of movable guide pieces is in an opened position, the plurality of movable guide pieces opens the U-shaped guide passage; and
   a nipping and cutting device configured to nip and cut the wire.

2. A wire measuring and cutting apparatus as claimed in claim 1, wherein;
   the guide unit comprises a guide block having forth and back paths configured to pass the wire therethrough, the forth and back paths being to open on a bottom face of the guide block and communicated to an inlet and an outlet of the substantially U-shaped guide passage respectively; and
   the forth and back paths each have a lower side configured to be closed by a shutter.

3. A wire measuring and cutting apparatus as claimed in claim 2, further comprising a displacement mechanism configured to move the plurality of movable guide pieces between the opened position and the closed position;
   wherein the displacement mechanism including:
     a claw part configured to engage with the plurality of movable guide pieces and maintain the plurality of movable guide pieces in the closed position;
     a solenoid device configured to disengage the claw part from the plurality of movable guide pieces when inputting a signal to confirm the wire at a first designated position in a process of measuring the length of the wire; and
     a cylinder device configured to move the plurality of movable guide pieces to the opened and closed positions and urge the plurality of movable guide pieces from the closed position to the opened position when inputting a signal to confirm the wire at a second designated position where the length of the wire is shorter than the length of the wire at the first designated position.

4. A wire measuring and cutting apparatus as claimed in claim 3, wherein the nipping and cutting device comprises:
   a first nipping unit configured to begin nipping the wire after passing the U-turn guide section when inputting the confirmation signal exhibiting the wire at the first designated position;
   a second nipping unit configured to nip the wire before reaching the U-turn guide section when a measuring of the wire has been completed;
   a cutting unit configured to cut the wire nipped by the first and second nipping units into a predetermined length; and
   a transfer unit configured to maintain the first and second nipping units in respective positions to allow to nip the wire and to transfer the wire to transfer clamps.

5. A wire measuring and cutting apparatus as claimed in claim 4, wherein;
   the first nipping unit comprises a pair of first nipping parts respectively configured to move up and down in two first through-holes formed to penetrate the guide block up and down while containing the back path and arranged at a proper distance along the back path;
   the second nipping unit comprises a pair of second nipping parts respectively configured to move up and down in two second through-holes formed to penetrate the guide block up and down while containing the forth path and arranged at a proper distance along the forth path;
   the shutter configured to open the first and second nipping units descend; and
   the transfer clamps configured to move and stop at respective intermediate positions of the first and second through-holes of the forth and back paths intermittently.

6. A wire measuring and cutting apparatus as claimed in claim 4, wherein at least one of the first and second nipping units comprises a servomotor configured to nip and release the wire.

7. A wire measuring and cutting apparatus comprising:
   wire feed means for measuring a length of a wire and feeding the wire along a designated pass line;
   guide means for guiding the wire being fed from the wire feed means into a substantially U-shaped guide passage, the guide means including a fixed guide part and a plurality of movable guide pieces each configured to pivot and together form the substantially U-shaped guide passage with the fixed guide part; and
   nipping and cutting means for nipping and cutting the wire.

8. A wire measuring and cutting apparatus as claimed in claim 7, further comprising displacement means for making the plurality of movable guide pieces to move pivotally with respect to the fixed guide part.

* * * * *

UNITED STATES PATENT AND TRADEMARK OFFICE
CERTIFICATE OF CORRECTION

PATENT NO.    : 6,345,561 B1
DATED         : February 12, 2002
INVENTOR(S)   : Hiroo Suzuki et al.

It is certified that error appears in the above-identified patent and that said Letters Patent is hereby corrected as shown below:

Column 5,
Line 31, after "and" insert the following: -- opening the U-turn guide section thereby to measure the length of the wire; --.

Column 6,
Line 28, change "roratably" to -- rotatably --.

Signed and Sealed this

Eighth Day of April, 2003

JAMES E. ROGAN
*Director of the United States Patent and Trademark Office*